United States Patent
Praca

(10) Patent No.: US 9,867,045 B2
(45) Date of Patent: Jan. 9, 2018

(54) METHOD OF MANAGING COMMUNICATION BETWEEN A SECURE ELEMENT AND A HOST DEVICE

(71) Applicant: GEMALTO SA, Meudon (FR)

(72) Inventor: Denis Praca, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/102,121

(22) PCT Filed: Oct. 17, 2014

(86) PCT No.: PCT/EP2014/072321
§ 371 (c)(1),
(2) Date: Jun. 6, 2016

(87) PCT Pub. No.: WO2015/086202
PCT Pub. Date: Jun. 18, 2015

(65) Prior Publication Data
US 2016/0309324 A1    Oct. 20, 2016

(30) Foreign Application Priority Data
Dec. 12, 2013  (EP) ..................... 13306705

(51) Int. Cl.
*H04W 12/06* (2009.01)
*H04L 29/06* (2006.01)
(Continued)

(52) U.S. Cl.
CPC ......... *H04W 12/06* (2013.01); *H04L 63/0853* (2013.01); *H04L 67/306* (2013.01); *H04W 8/183* (2013.01)

(58) Field of Classification Search
CPC .. H04W 12/06; H04W 8/183; H04L 63/0853; H04L 67/306
(Continued)

(56) References Cited

U.S. PATENT DOCUMENTS

2009/0037927 A1    2/2009  Sangili et al.
2011/0111778 A1*   5/2011  Son .................. G06F 9/546
                                                    455/466

(Continued)

FOREIGN PATENT DOCUMENTS

WO    WO 2008/123827 A1    10/2008

OTHER PUBLICATIONS

International Search Report (PCT/ISA/210) dated Dec. 22, 2014, by the European Patent Office as the International Searching Authority for International Application No. PCT/EP2014/072321.
(Continued)

*Primary Examiner* — Marisol Figueroa
(74) *Attorney, Agent, or Firm* — Buchanan Ingersoll & Rooney PC

(57) ABSTRACT

The invention is a method of managing communication between a host device and a secure element comprising two virtual profiles. The method comprises the steps of: running simultaneously both virtual profiles in the secure element, generating an incoming data from the host device by multiplexing a first command targeting one virtual profile and another command targeting the other virtual profile and sending the incoming data to the secure element, demultiplexing both commands at the secure element side and sending each command to the targeted virtual profile, getting response messages generated by both virtual profiles by executing said commands, generating an outgoing data by multiplexing the response messages and sending this outgoing data to the host device, and demultiplexing the response messages at the host device side.

9 Claims, 3 Drawing Sheets

(51) Int. Cl.
  *H04L 29/08*   (2006.01)
  *H04W 8/18*    (2009.01)
(58) Field of Classification Search
  USPC .......................................................... 455/558
  See application file for complete search history.

(56) References Cited

U.S. PATENT DOCUMENTS

| | | | |
|---|---|---|---|
| 2011/0271044 A1* | 11/2011 | Narendra | G06F 12/1425 |
| | | | 711/103 |
| 2013/0023235 A1 | 1/2013 | Fan et al. | |
| 2013/0165073 A1* | 6/2013 | Madsen | H04W 12/06 |
| | | | 455/411 |
| 2014/0066120 A1* | 3/2014 | Sharma | H04W 88/06 |
| | | | 455/552.1 |
| 2014/0342719 A1* | 11/2014 | Lindholm | G06F 21/77 |
| | | | 455/418 |

OTHER PUBLICATIONS

Written Opinion (PCT/ISA/237) dated Dec. 22, 2014, by the European Patent Office as the International Searching Authority for International Application No. PCT/EP2014/072321.

* cited by examiner

METHOD OF MANAGING COMMUNICATION BETWEEN A SECURE ELEMENT AND A HOST DEVICE

FIELD OF THE INVENTION

The present invention relates to methods of managing the communication between a secure element and a device. It relates particularly to methods of managing the communication with a secure element comprising several virtual profiles.

BACKGROUND OF THE INVENTION

A secure element (SE) is a physical component able to store data and to provide services in a secure manner. In general, a secure element has a limited amount of memory, a processor with limited capabilities and is devoid of battery. For instance a UICC (Universal Integrated Circuit Card) is a secure element embedding SIM applications for telecommunication purposes. A secure element can be installed, fixedly or not, in a terminal, like a mobile phone for example. In some cases, the terminals are constituted by machines that communicate with other machines for M2M (Machine to Machine) applications.

A secure element can be in the format of a smart card, or may be in any other format such as for example but not limited to a packaged chip as described in PCT/SE2008/050380, or any other format. A UICC can be used in mobile terminals in GSM and UMTS networks for instance. The UICC ensures network authentication, integrity and security of all kinds of personal data.

A smart card consists of a CPU, ROM, RAM, EEPROM and I/O circuits. Early versions consisted of the whole full-size (85×54 mm, ISO/IEC 7810 ID-1) smart card. Soon the race for smaller host device called for a smaller version of the card.

It is known to solder or weld the secure element in a host device, in order to get it dependent of this host device. This is done in M2M (Machine to Machine) applications. The same objective is reached when a chip (a secure element) containing a Payment application, SIM or USIM applications and files is contained in the host device. The chip is for example soldered to the mother-board of the host device or machine and constitutes an e-secure element (eSE).

The present invention applies also to such soldered eSEs or to such chips containing the same applications than the chips comprised in SEs. A parallel can be done for secure elements that are not totally linked to devices but that are removable with difficulty because they are not intended to be removed, located in host devices that are distant or deeply integrated in machines. A special form factor of the secure element (very small for example and therefore not easy to handle) can also be a reason to consider it as in fact integrated in a host device. The same applies when a secure element is integrated in a machine that is not intended to be opened.

In the next description, welded SEs or chips containing or designed to contain the same applications than secure elements will generally be called embedded secure elements (in contrast to removable secure elements). This will also apply to secure elements that are removable with difficulty.

A secure element is a physical component embedding a chip. In addition, the secure element contains a profile which includes a set of applications, a set of personal data and a set of secret data. The Operating System is executed on the chip for providing services. The set of applications is executed on the chip for providing services for the host device or a remote machine accessed through the host device. The set of personal data (like phonebook, ICCID or IMSI for an UICC) is stored in the physical memory of the chip used by the Operating System. The set of secret data (e.g. keys and PINs) is stored securely in a physical memory of the chip and used by the Operating System to provide secure services.

The profile could be linked to a subscription. It may contain network access applications (NAA), payment applications or third party applications providing security for a specific service (e.g. NFC applications).

A physical secure element can emulate several virtual secure elements, each one represented as one profile. In such a case, these profiles are called logical profiles or virtual profiles. An emulated profile is hereinafter called virtual profile. Usually each virtual profile is a software based profile.

The invention concerns a way to access several virtual profiles which are run in a single secure element.

In the state of the art, the basic behaviour to switch from a first virtual profile to another one is to physically reset the whole secure element (ex: reset as defined by ISO7816-3 standard for an smart card), and after this hardware reset, to execute the Operating System of the newly selected virtual profile. Thus only one virtual profile is active at a time in a device session.

There is a need to manage several virtual profiles simultaneously active and reachable outside the secure element.

SUMMARY OF THE INVENTION

An object of the invention is to solve the above mentioned technical problem.

The object of the present invention is a secure element comprising a communication interface and first and second virtual profiles. The secure element is configured to get electric power from a host machine connected through said communication interface. The secure element comprises an execution component configured to run simultaneously said first and second virtual profiles. The secure element comprises a communication component configured to receive an incoming data through the communication interface, said incoming data comprising a first command intended to be executed by the first virtual profile and a second command intended to be executed by the second virtual profile. The communication component is configured to demultiplex said first and second commands and to send said first command to the first virtual profile and the second command to the second virtual profile. The communication component is configured to get a first response message generated by the first virtual profile by executing the first command and a second response message generated by the second virtual profile by executing the second command. The communication component is configured to generate an outgoing data by multiplexing said first and second response messages and to send the outgoing data through the communication interface.

Advantageously, the secure element may be configured to send said first and second response messages during a single device session.

Advantageously, the communication component may be configured to get an identifier included in a field uniquely allocated to the first command, said identifier meaning that said first command is intended to be executed by the first virtual profile.

Advantageously, the communication component may be configured to retrieve from the incoming data a third command and to execute the third command for selecting the first virtual profile.

Advantageously, the communication component may be configured to handle a first reset signal allowing to reset the secure element, a second reset signal allowing to reset the first virtual profile and a third reset signal allowing to reset the second virtual profile, wherein said first, second and third reset signals are different.

Advantageously, the secure element may be an UICC able to manage proactive commands and the communication component may be configured to multiplex and to demultiplex a set of proactive commands initiated by said first and second virtual profiles.

Another object of the invention is a device having a communication connector configured to communicate with a secure element according to the invention. The device comprises an enhanced generator configured to multiplex and to demultiplex a set of commands targeting said first and second virtual profiles.

Another object of the invention is a method for managing communication between a secure element and a device. The secure element comprises a communication interface and first and second virtual profiles. The secure element is configured to get electric power from the device connected through said communication interface. The method comprises the steps of:
- running simultaneously said first and second virtual profiles into the secure element,
- generating an incoming data from the device by multiplexing a first command intended to be executed by the first virtual profile and a second command intended to be executed by the second virtual profile, and sending said incoming data to the secure element through the communication interface,
- demultiplexing said first and second commands at secure element side and sending said first command to the first virtual profile and the second command to the second virtual profile,
- getting a first response message generated by the first virtual profile by executing the first command and a second response message generated by the second virtual profile by executing the second command,
- generating an outgoing data by multiplexing said first and second response messages and sending the outgoing data to the device through the communication interface,
- demultiplexing said first and second response messages at the device side.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of secure element intended to contain several virtual profiles. The secure element may be coupled to any type of host machine able to establish a communication channel with the secure element. For example the host machine may be a mobile phone, a vehicle, a meter, a slot machine, a TV or a computer.

Figure 1:
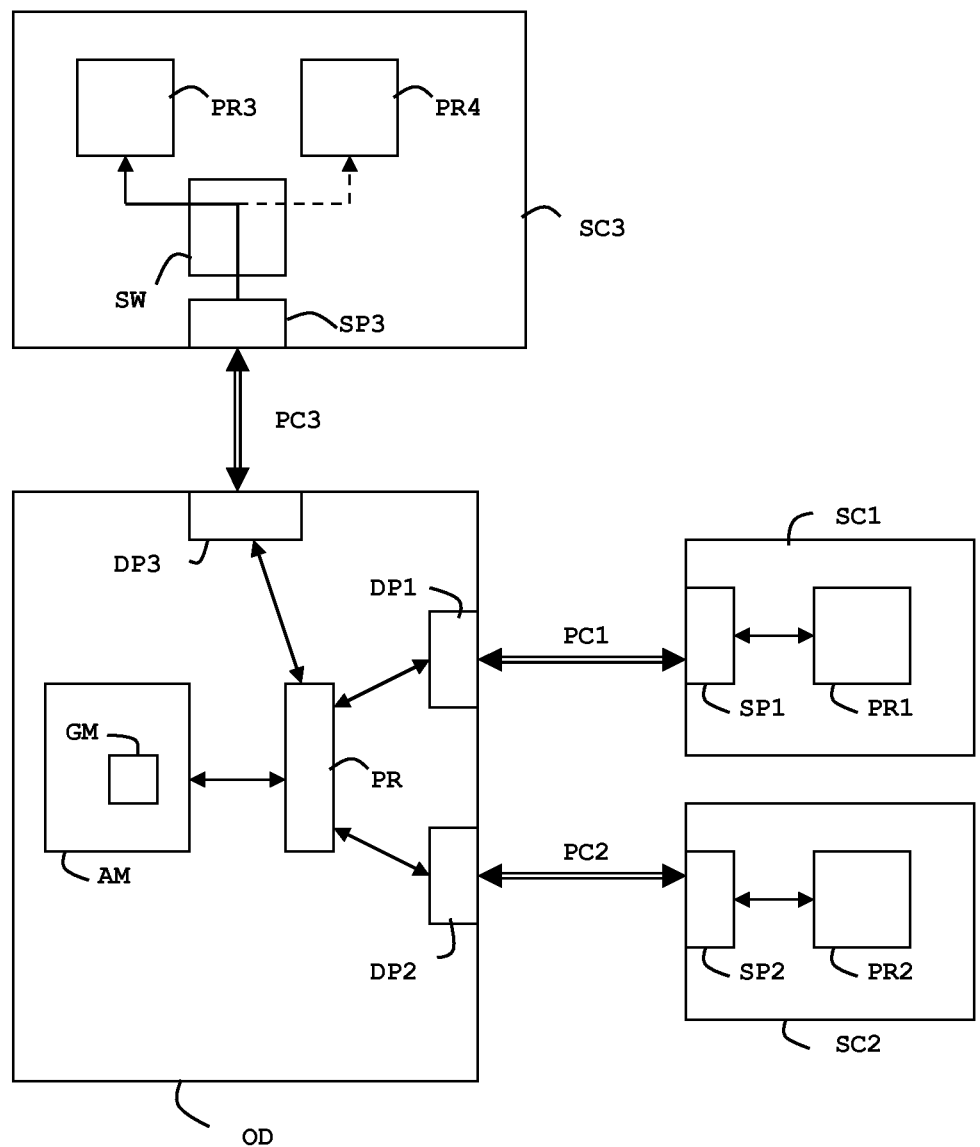
FIG. 1 is an example of a management of communication with secure elements according to the prior art.

FIG. 1 shows an example of management of communication with secure elements according to the prior art.

In this example, the host device OD is a Telecom terminal having three communication interfaces DP1, DP2 and DP3. The host device OD comprises an application manager AM which is designed to communicate with a secure element of UICC type. More specifically, the application manager AM targets an UICC through its corresponding communication interface. Moreover, the application manager AM can communicate with one element at a time. The application manager AM comprises a generator GM which is able to generate the commands intended to be sent to an UICC.

The host device OD comprises a physical router PR which routes the command to the communication interface corresponding to the targeted UICC.

In the example of FIG. 1, a communication channel PC1 can be established between the host device OD and the UICC SC1 through the two communication interfaces DP1 and SP1. This communication channel PC1 allows the application manager AM to communicate with the profile PR1 of the UICC SC1. Similarly, a communication channel PC2 can be established between the host device OD and the UICC SC2 through the two communication interfaces DP2 and SP2. Thus the application manager AM can communicate with the profile PR2 of the UICC SC2. The profiles PR1 and PR2 may be run simultaneously in two distinct secure elements.

In the example of FIG. 1, a communication channel PC3 can be established between the host device OD and the UICC SC3 through the two communication interfaces DP3 and SP3. The UICC SC3 comprises two virtual profiles PR3 and PR4. The UICC SC3 comprises a switch SW placed between the communication interface SP3 and the virtual profiles PR3 and PR4. Only one virtual profile can be active at a time in the UICC SC3.

The switch SW allows to activate a virtual profile (and to deactivate the current virtual profile) in response to a Reset of the secure element SC3. The activation of a specific profile is made by the host device using a dedicated command before issuing the reset command.

The communication channel PC3 allows the application manager AM to communicate with either the virtual profile PR3 or the virtual profile PR4. In this case, the host device OD cannot simultaneously access several virtual profiles in the UICC SC3.

Figure 2:
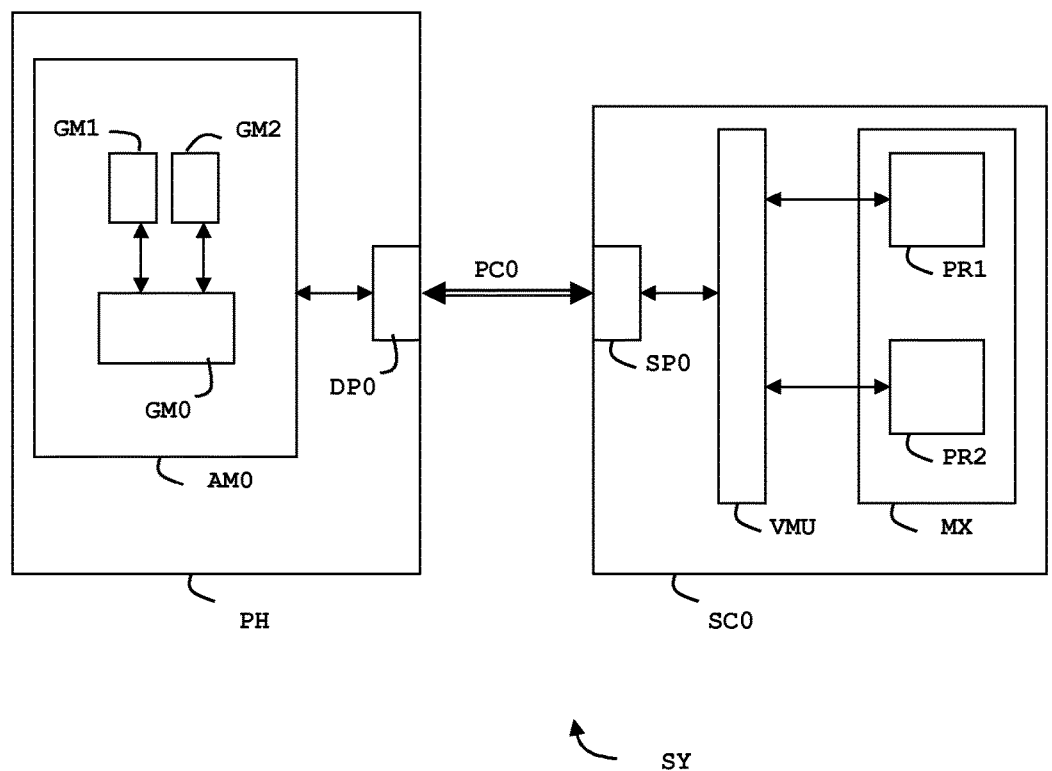
FIG. 2 is an example of a management of communication with a secure element according to the invention.

FIG. 2 shows a system SY comprising a host device PH and a secure element SC0 according to the invention.

In this example, the host device PH is a mobile phone having a single communication interfaces DP0 for communicating with a secure element. The host device PH comprises an application manager AM0 which is designed to communicate with a secure element SC0 of UICC type. More specifically, the application manager AM0 is configured to simultaneously target several virtual profiles through the common communication interface DP0. The application manager AM0 comprises two generators GM1 and GM2 similar to the generator GM of FIG. 1. Preferably, the generators GM1 and GM2 are configured to generate APDU commands compliant with ETSI standards related to smart cards and Telecom. The application manager AM0 comprises an enhanced generator GM0 which is able to get the command from the generators GM1 and GM2 and to add specific information targeting the communication component VMU of the secure element SC0. The application manager AM0 is configured to send to the secure element SC0 an incoming data IA comprising both commands targeting the virtual profile and said specific information.

The secure element SC0 is an UICC which comprises a communication interface SP0 and an execution component MX. The execution component MX comprises the virtual profiles PR1 and PR2 and is able to run simultaneously both virtual profiles PR1 and PR2.

In other words, the execution component MX is able to start execution of a command in a virtual profile before the end of the execution of a previous command in another virtual profile.

The secure element SC0 comprises a communication component VMU placed between the communication interface SP0 and the virtual profiles PR1 and PR2. The communication component VMU is able to receive the incoming data IA from the communication interface SP0, to retrieve the specific information and the commands targeting the virtual profiles by demultiplexing the incoming data IA. The communication component VMU is configured to forward the command to the relevant virtual profile based on the specific information.

Figure 3:
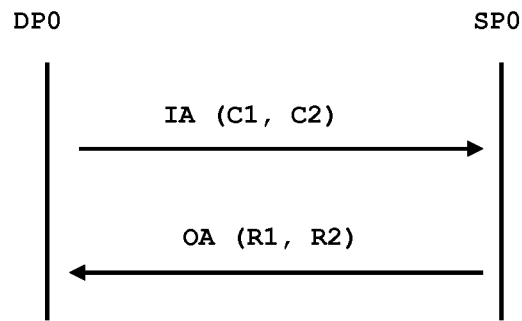
FIG. 3 depicts a first example of message exchange between a host device and a secure element according to the invention.

In one example, the specific data may be a set of identifiers allocated to each command. Each identifier allows to uniquely identify the virtual profile targeted by the command. For instance, the identifier may be coded in a one byte field placed before each command. By way of illustration, FIG. 3 shows the incoming data IA sent from the communication interface DP0 to the communication interface SP0 of the UICC. This incoming data IA contains a command C1 targeting the virtual profile PR1 and a command C2 targeting the virtual profile PR2. The virtual profile PR1 generates a response message R1 by executing the command C1 and the virtual profile PR2 generates a response message R2 by executing the command C2. Then the communication component VMU gets the two response messages R1 and R2, generates an outgoing data OA by multiplexing these response messages and sends the outgoing data OA to the host device PH through the communication channel PC0.

The communication component VMU is configured to add outgoing specific data in the outgoing data OA in order to make the application manager AM0 able to forward each response message to the relevant generator (either GM1 or GM2).

Figure 4:
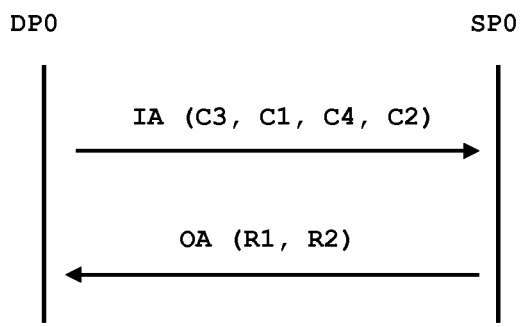
FIG. 4 depicts a second example of message exchange between a host device and a secure element according to the invention.

In another example, the specific data may be a "select" command targeting the communication component VMU. In this case the "select" command has a parameter allowing identifying the relevant virtual profile. Thus the "select" command is not forwarded to any virtual profile. By way of illustration, FIG. 4 shows the incoming data IA sent from the host device PH to the UICC SC0. This incoming data IA contains a command C1 targeting the virtual profile PR1, a command C2 targeting the virtual profile PR2 and two commands C3 and C4 (e.g. Select) targeting the communication component VMU. It is assumed that the command C3 requests the communication component VMU to send the further command(s) to the virtual profile PR1 and the command C4 requests the communication component VMU to send the further command(s) to the virtual profile PR2. In this case, the command C3 is carried out by the communication component VMU so that the next command C1 is forwarded to the profile PR1. Then the communication component VMU executes the command C4 and forward the command C2 is forwarded to the profile PR2. Then the communication component VMU generates an outgoing data OA by multiplexing the response messages R1 and R2 without result corresponding to the commands C3 and C4 as such.

The response messages R1 and R2 are sent to the host device PH during a single device session. In other words, there is no reset of the secure element between the sending of R1 and the sending of R2.

Advantageously, the communication component VMU is configured to handle a first reset signal allowing resetting the secure element SC0 only, a second reset signal allowing to reset the virtual profile PR1 only and a third reset signal allowing to reset the virtual profile PR2 only. These reset signals are different and allow to accurately manage the state of each virtual profile and the state of the whole secure element SC0.

Advantageously, the secure element SC0 may be an UICC able to manage proactive commands according to TS 102 223 and the communication component VMU can be configured to multiplex and to demultiplex a set of proactive commands initiated by the virtual profiles PR1 and PR2.

The communication component VMU is a logical multiplexer allowing to route command and response between a single hardware communication interface and several virtual profiles.

It must be understood, within the scope of the invention, that the above-described embodiments are provided as non-limitative examples. In particular, the secure element may comprise any number of virtual profiles.

The architecture of the host device shown at FIG. 2 is provided as an example only. The architecture may different. For example, the application manager AM0 and the enhanced generator GM0 may be merged as a unique component.

The invention is not limited to a secure element of UICC type and may apply to any service domains like payment, access management, passport, or data protection.

The above described communication interfaces are physical interfaces which may work in either contact mode or in contactless mode.

The invention claimed is:

1. A secure element comprising:
   a communication interface and first and second virtual profiles, said secure element being configured to get electric power from a host machine connected through said communication interface,
   wherein each of said virtual profiles is an emulated secure element,
   wherein each of said virtual profiles is associated with a subscription,
   wherein said secure element comprises an execution component configured to run simultaneously said first and second virtual profiles,
   wherein said secure element comprises a communication component configured to:
   receive an incoming data through the communication interface, said incoming data comprising a first command intended to be executed by the first virtual profile, a second command intended to be executed by the second virtual profile and a specific incoming information, to demultiplex said first and second commands, to send said first command to the first virtual profile and the second command to the second virtual profile based on said specific incoming information, to get a first response message generated by the first virtual profile by executing the first command and a second response message generated by the second virtual profile by executing the second command, to generate an outgoing data by multiplexing said first and second response messages, and to send the outgoing data through the communication interface, and wherein said execution component is further configured to start execution of said second command in said second virtual profile before end of execution of said first command in said first virtual profile.

2. A secure element according to claim 1, wherein said secure element is configured to send first and second response messages in a single device session.

3. A secure element according to claim 1, wherein the specific incoming information comprises an identifier included in a field uniquely allocated to the first command and wherein the communication component is configured to get the identifier, said identifier indicating that said first command is intended to be executed by the first virtual profile.

4. A secure element according to claim 1, wherein the specific incoming information comprises a third command and wherein the communication component is configured to retrieve said third command from the incoming data and to execute said third command for selecting the first virtual profile.

5. A secure element according to claim 1, wherein said communication component is configured to handle a first reset signal to reset the secure element, a second reset signal to reset the first virtual profile and a third reset signal to reset the second virtual profile, said first, second and third reset signals being different.

6. A secure element according to claim 1, wherein said secure element is an UICC configured to manage proactive commands and wherein said communication component is configured to multiplex and to demultiplex a set of proactive commands initiated by said first and second virtual profiles.

7. A device having a communication connector configured to communicate with a secure element according to claim 1, wherein the device comprises an enhanced generator configured to multiplex and to demultiplex a set of commands targeting said first and second virtual profiles.

8. A method for managing communication between a secure element and a device, said secure element comprising a communication interface and first and second virtual profiles, said secure element being configured to get electric power from the device connected through said communication interface, wherein each of said virtual profiles is an emulated secure element, wherein each of said virtual profiles is associated with a subscription, and wherein said method comprises the steps:

running simultaneously said first and second virtual profiles in the secure element, generating an incoming data from the device by multiplexing a first command intended to be executed by the first virtual profile and a second command intended to be executed by the second virtual profile and by adding specific incoming information in the incoming data, and sending said incoming data to the secure element through the communication interface, demultiplexing said first and second commands at the secure element, and sending said first command to the first virtual profile and the second command to the second virtual profile, said sending being based on said specific incoming information, getting a first response message generated by the first virtual profile by executing the first command and a second response message generated by the second virtual profile by executing the second command, wherein execution of the second command in the second virtual profile is started before end of the execution of the first command in the first virtual profile, generating at the secure element an outgoing data by multiplexing said first and second response messages and sending the outgoing data to the device through the communication interface, and demultiplexing said first and second response messages at device.

9. The method of claim 7, wherein the device further comprises an application manager configured to simultaneously target said first and second virtual profiles through the communication connector.

* * * * *